United States Patent [19]
Imhof et al.

[11] Patent Number: 5,424,149
[45] Date of Patent: Jun. 13, 1995

[54] ELECTROCHEMICAL STORAGE DEVICE AND METHOD FOR PRODUCING SAME

[75] Inventors: Otwin Imhof, Nürtingen; Holger Kistrup, Esslingen; Wilhelm Kitzhöfer, Brilon, all of Germany

[73] Assignees: Deutsche Automobilgesellschaft mbH, Braunschweig; Daug-Hoppecke Gesellschaft fuer Batteriesysteme mbH, Brilon, both of Germany

[21] Appl. No.: 160,098

[22] Filed: Dec. 1, 1993

[30] Foreign Application Priority Data

Dec. 1, 1992 [DE] Germany ............. 42 40 337.5

[51] Int. Cl.⁶ ................................... H01M 2/26
[52] U.S. Cl. .................... 429/161; 429/211; 29/623.4
[58] Field of Search ............ 429/160, 161, 211; 29/623.4, 2

[56] References Cited

U.S. PATENT DOCUMENTS

| | | | |
|---|---|---|---|
| 509,266 | 11/1893 | Usher | 429/211 X |
| 2,637,759 | 5/1953 | Shannon | 429/161 |
| 4,309,492 | 1/1982 | Bernard | 429/161 |
| 5,158,842 | 10/1992 | McHenry | 429/161 |
| 5,246,797 | 9/1993 | Uthof et al. | 429/211 |

*Primary Examiner*—Stephen Kalafut
*Attorney, Agent, or Firm*—Evenson, McKeown, Edwards & Lenahan

[57] ABSTRACT

An electrochemical storage device which has electrode plates of different polarity which are alternately stacked on one another to form an electrode stack. Each of the electrode plates is formed from an electrode framework with a current-collecting lug arranged thereon. Identically polarized current-collecting lugs of an electrode stack are connected in an electrically conductive fashion to a terminal yoke. In order to ensure better welding, the terminal yoke has at the location of the current-collecting lugs a transverse slot into which the free end region of a current-collecting lug projects. The current-collecting lug is attached to the terminal yoke on the flat side that is remote from the electrode stack.

32 Claims, 5 Drawing Sheets

ELECTROCHEMICAL STORAGE DEVICE AND METHOD FOR PRODUCING SAME

BACKGROUND AND SUMMARY OF THE INVENTION

The present invention relates to an electrochemical storage device having electrode plates of different polarity alternately stacked on one another, each electrode plate being formed from an electrode framework having a current-collecting lug arranged thereon, the individual, identically polarized current-collecting lugs being connected in an electrically conductive fashion with their weld-on rims arranged on their free end region to a terminal yoke extending parallel to the electrode stack formed from the electrode plates and transverse to the flat side of the current-collecting lugs. The present invention also relates to a method for producing an electrochemical storage device which has a plurality of electrode plates formed in each case from an electrode framework having a current-collecting lug welded on the end, the individual, identically polarized current-collecting lugs being connected in an electrically conductive fashion with their weld-on rims arranged on their free ends to a terminal yoke. Each of the current-collecting lugs is connected at the end by in each case one electrode framework to an electrode plate, the electrode plates being stacked on one another with the intercalation of various parts such as separators, recombiners etc. transverse to their flat irons to form an electrode stack. The electrode stack is insulated on the outside and inserted into a housing. The current-collecting lugs respectively of the same polarity are connected with their weld-on rim arranged on the free end region to a terminal yoke assigned to this polarity and on which a terminal pillar is arranged.

The fundamental electrochemical storage device of the above-described generic type has electrode plates of different polarity stacked on one another, each electrode plate being formed from a current-collecting lug having an electrode framework arranged on its one end region. The electrode plates are stacked on one another alternately to form an electrode stack, with separators being arranged between electrode plates of different polarity and recombiners being arranged between two successive electrode plates of the same, negative polarity, and electrode plates of the same polarity being connected to one another in an electrically conductive fashion via a terminal yoke. The current-collecting lugs are welded to the terminal yoke by electrical resistance welding along a weld-on rim arranged at their end region, for the purpose of electrically connecting the electrode plates of the same polarity. In order to simplify the welding, the weld-on rims of the current-collecting lugs are bent transverse to the flat side of the other current-collecting lug, preferably by an angle of approximately 90°, the weld-on rim being provided with welding knobs in order to improve the welding result. In spite of these welding knobs, defective or poor welds keep recurring, which particularly in the case of high-quality electrochemical storage devices such as, for example, batteries for space, signify rejection.

An object of the present invention is to improve a fundamental storage device of the initially described type to reduce rejections due to welding the current-collecting lugs to the terminal yoke. Furthermore, a method for producing it is to be developed.

This and other objects are achieved by the present invention which provides an electrochemical storage device comprising electrode plates of different polarity alternately stacked on one another to form an electrode stack, each electrode plate including an electrode framework and a current-collecting lug arranged thereon, the current-collecting lugs having weld-on rims arranged on a free end region. A terminal yoke extends parallel to the electrode stack and transverse to a flat side of the current-collecting lugs, with individual identically polarized current-collecting lugs being connected in an electrically conductive fashion with their weld-on rims to the terminal yoke. The terminal yoke has a flat side remote from the electrode stack, and a transverse slot at a location of a current-collecting lug into which the free end region of the current-collecting lug at least projects. The current-collecting lug is attached to the terminal yoke in the region of the flat side of the terminal yoke.

The above-stated objects are also achieved by an embodiment of the present invention which provides a method for producing an electrochemical storage device comprising forming a plurality of electrode plates by welding a plurality of current-collecting lugs respectively on an end of an electrode framework, stacking the electrode plates on one another with the intermediate positioning of elements transverse to flat sides of the electrode plates to form an electrode stack, and insulating outer regions of the electrode stack. The electrode stack is inserted into a housing. The weld-on rims of the current-collecting lugs are plugged into transverse slots of the terminal yoke. In an electrically conductive manner, the individual, identically polarized current-collecting lugs are connected to a terminal yoke assigned to this polarity, the current-collecting lugs being connected to said terminal yoke by weld-on rims of free ends of the current-collecting lugs to the terminal yoke, the terminal yoke having webs between the transverse slots, and a terminal pillar. The step of connecting the current-collecting lugs to the terminal yoke includes electrical resistance welding the weld-on rims of the current-collecting lugs to the webs of the terminal yoke.

Due to the design according to the invention of the current-collecting lug and the terminal yoke, the weld of the terminal yoke with the weld-on rims of the current-collecting lug, which weld is easy to produce, has a high strength and low contact resistances, these properties being ensured even in the case of high vibration loads on the electrochemical storage device.

A further advantage is that, with a welded connection of the terminal yoke and the current-collecting lug as against a screwed connection, a plurality of components are spared and thus the mass of the storage device is reduced, the overall height of the storage device is reduced and the contact resistance between the current-collecting lug and terminal yoke is lower. On the production side, there is the further advantage that the production of the storage device according to the invention can be automated since, inter alia, the welding zones are easily accessible after the assembly of the cell stack. The result is that, despite the higher quality of the electrochemical storage device and despite reduced rejection during production, there is a reduction in cost during production of the electrochemical storage device and a shorter production time.

Other objects, advantages and novel features of the present invention will become apparent from the following detailed description of the invention when con-

DETAILED DESCRIPTION OF THE DRAWINGS

In the following description, an embodiment of a terminal yoke 1 (FIGS. 1 and 2) will first be described, then an embodiment of an associated current-collecting lug 2 (FIGS. 3 to 5), and finally two arrangements of the terminal yoke 1 and a plurality of current-collecting lugs 2 stacked on one another to form an electrode stack 5 (see FIGS. 8 and 9). These common arrangements are subdivided into an arrangement of positive polarity (FIG. 8) and into an arrangement of negative polarity (FIG. 9). Due to the mutual dependencies in the configuration of the terminal yoke 1 and the current-collecting lug 2, it will be impossible to avoid referring back to or anticipating the respective other element.

Figure 1:
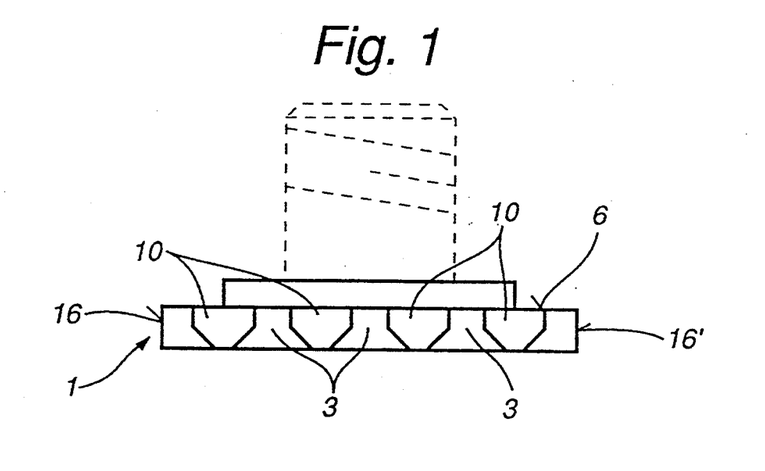
FIG. 1 shows a side view of the terminal yoke constructed in accordance with an embodiment of the present invention.
Figure 2:
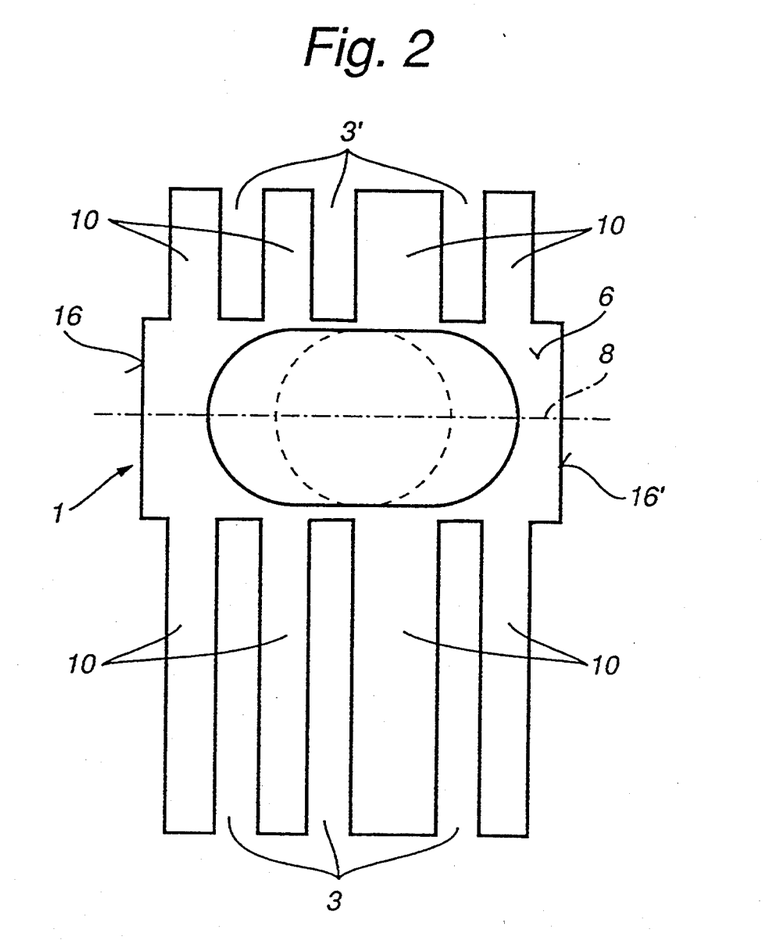
FIG. 2 shows a plan view of the terminal yoke according to the embodiment of FIG. 1.

The side view of a terminal yoke 1 is represented in FIG. 1 and the plan thereof in FIG. 2. The terminal yoke 1, which for reasons of cost is produced from nickelized steel in the illustrated embodiment, has a plurality of webs 10 which are spaced apart from one another by transverse slots 3, 3' open at the edge side and are arranged on a solid middle part of the terminal yoke 1. The webs 10 are at an approximately right angle relative to the longitudinal center line 8 of the solid middle part of the terminal yoke 1. The webs 10 are aligned on both sides of the solid middle part and project outwards. For the sake of better comprehension, the terminal pillar of the terminal yoke 1, which is appropriately welded on the solid middle part, is additionally illustrated by dashes.

It is advantageous for the purpose of a simple and unambiguous arrangement of current-collecting lugs 2 of one polarity if the transverse slots 3 arranged along one side of the terminal yoke 1 are longer than the transverse slots 3' arranged along the other side of the terminal yoke 1.

So as to have available an adequate area for the later welding of the current-collecting lugs 2 to the webs 10 of the terminal yoke 1, the width of the webs 10 situated between two adjacent transverse slots 3, 3' corresponds to 10 to 25 times the thickness of the current-collecting lugs 2.

Moreover, the transverse slots 3, 3' on the flat side 6 of the terminal yoke 1 facing the electrode stack 5 are chamfered, thus facilitating the insertion of an upper end region 4 of a current-collecting lug 2 of an electrode stack 5. The mass of the terminal yoke 1 is simultaneously reduced by means of this measure.

In certain embodiments, the terminal yoke 1 has transverse slots only on one side. This allows the current-collecting lugs 2 to be inserted at the edge side. It is appropriate in this unillustrated embodiment for the webs 10 to be chamfered at the edge side in a way which facilitates lateral insertion.

Figure 3:
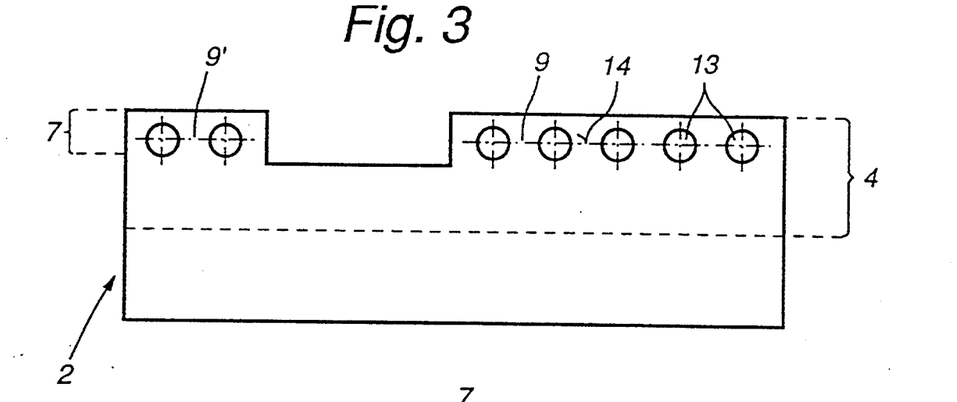
FIG. 3 shows the view onto an upper end region of a current-collecting lug.
Figure 4:
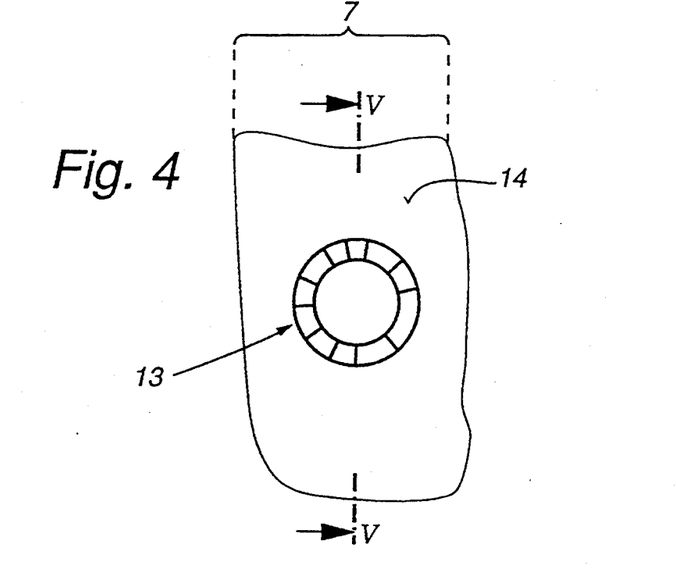
FIG. 4 shows an enlargement of a section of the current-collecting lug according to FIG. 3 in the region of its weld-on rim.
Figure 5:
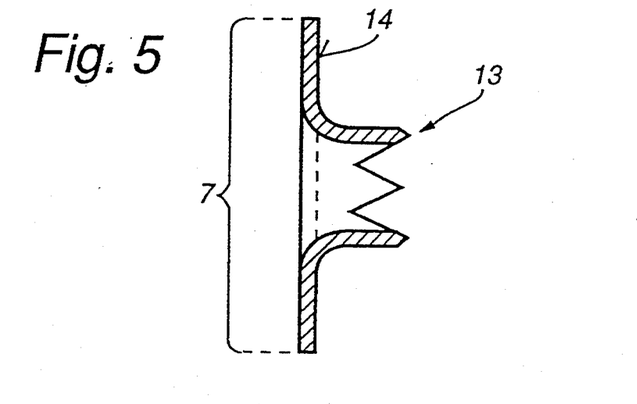
FIG. 5 shows a section through FIG. 4 along the line V—V.

FIG. 3 shows a current-collecting lug 2 corresponding to the terminal yoke 1 according to FIGS. 1 and 2. On its free, upper end region 4, the current-collecting lug 2 has two lug tongues 9, 9' which during later assembly are assigned to the opposite transverse slots 3, 3' of the terminal yoke 1. The weld-on rim 7 of the current-collecting lug 2 is provided with welding knobs arranged on the lug tongues 9, 9'. So that the weld-on rims 7 of the current-collecting lugs 2 do not project in the region of the transverse slots 3, 3', the extent of the weld-on rims 7 corresponds to the external dimension of the terminal yoke 1 measured in the direction and at the level of the transverse slots 3, 3'. The welding knobs are constructed as solid-walled material protuberances 13. As represented in FIGS. 4 and 5, the material protuberances 13 have a cutout from the rims of which there project sheet metal tongues which are aligned transverse to the flat side of the weld-on rim 7, which flat side is to be welded on, and which form a toothed crown.

Figures 6, 7:
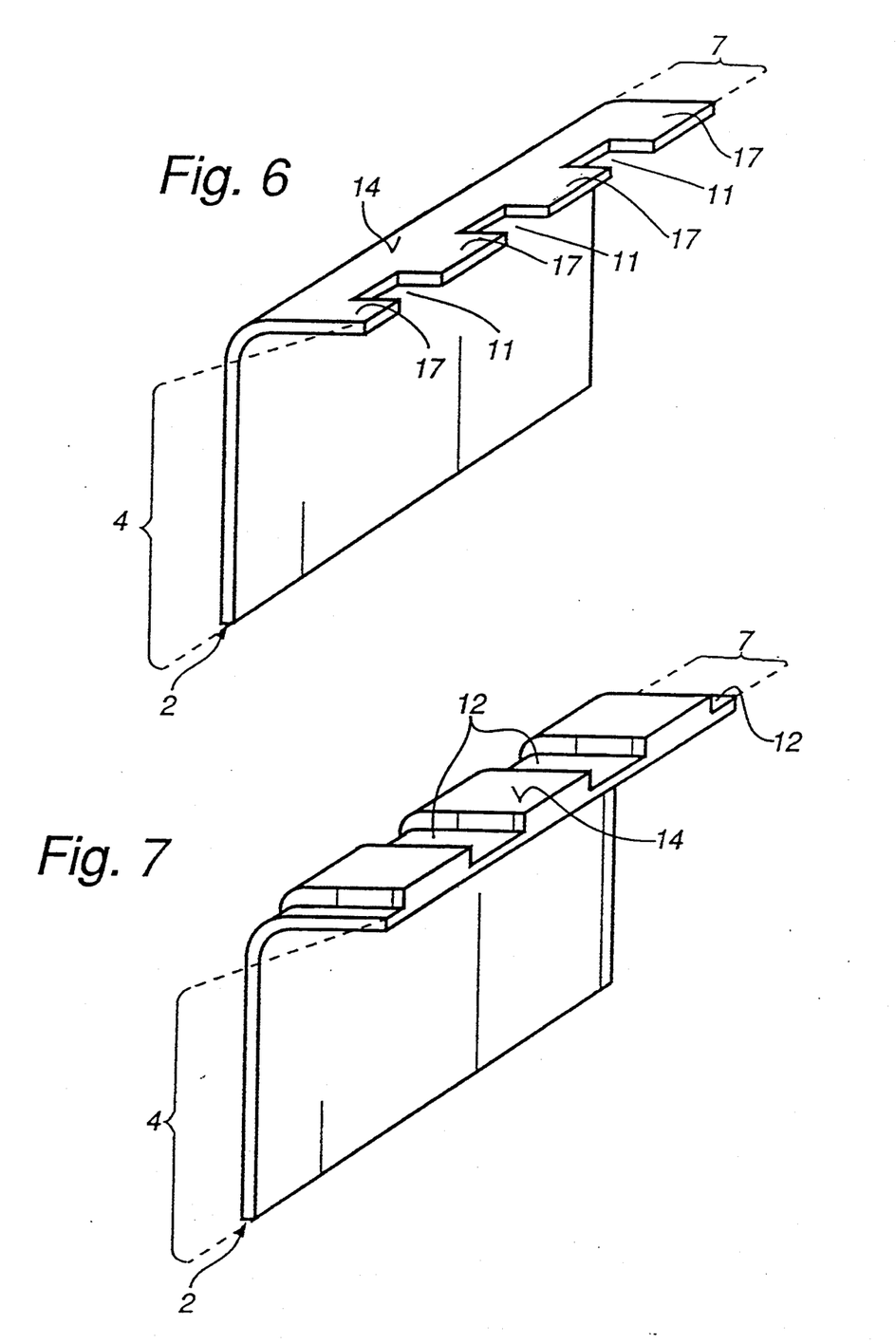
FIG. 6 shows a weld-on rim of a current-collecting lug provided with tongues spaced apart from one another by cutouts.
FIG. 7 shows a weld-on rim of a current-collecting lug provided with welding knobs spaced apart from one another by material recesses.

As represented in FIGS. 6 and 7, in certain embodiments, the welding knob are tongues 17 spaced apart from one another by cutouts 11 or by material recesses 12, the material recesses 12 being deeper than the degree of sinking when the weld-on rim 7 is welded onto the terminal yoke 1.

It is desired that the weld-on rim 7 provided with welding knobs 13 be plugged in through the transverse slot 3, 3' of the terminal yoke 1 assigned to it as far as over the flat side 6 remote from the electrode stack 5. For this purpose, the clear width of the transverse slots 3, 3' measured parallel to the surface normal of a plugged-in current-collecting lug 2 corresponds at least to the thickness of the current-collecting lug 2 plus the height of the welding knobs above the current-collecting lug 2. In particular, this clear width of the transverse slots is 7 to 18 times the thickness of the current-collecting lugs 2, the current-collecting lugs 2 having a thickness of between 0.1 mm and 1.0 mm.

Figure 8:
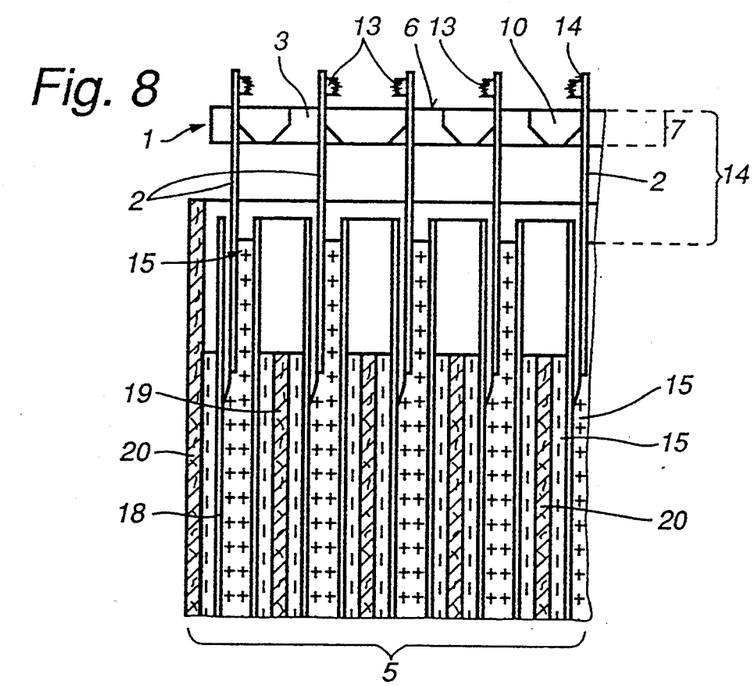
FIG. 8 shows an electrode stack before welding, having current-collecting lugs plugged through transverse webs of a positive terminal yoke, the current-collecting lugs being aligned parallel to a flat side of their respective electrode framework.
Figure 9:
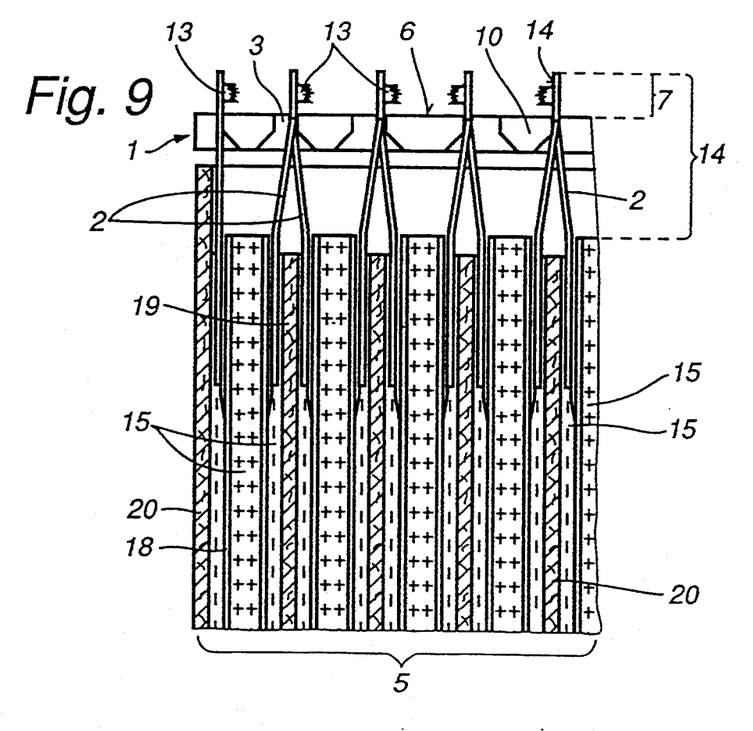
FIG. 9 shows an electrode stack before welding, having current-collecting lugs plugged through transverse webs of the negative terminal yoke, the current-collecting lugs being inclined towards a flat side of their respective electrode framework.

FIGS. 8 and 9 represent an electrochemical storage device without a storage device housing, the representation in accordance with FIG. 8 relating to mounting the positive electrode plates 18, and FIG. 9 to the mounting of the negative electrode plates 15 on the respectively associated terminal yoke 1.

The electrochemical storage device represented in FIGS. 8 and 9 has an electrode stack 5 which is formed from electrode plates 15 of different polarity alternately stacked on one another, each electrode plate 15 having an electrode framework with a current-collecting lug 2 welded thereon. The individual, identically polarized current-collecting lugs 2 of the electrode stack 5 are connected in an electrically conductive fashion to a terminal yoke 1 by electrical resistance welding of their weld-on rims 7, which are arranged on the respective free end region 4 of each individual current-collecting lug 2, the terminal yoke 1 extending parallel to the electrode stack 5 and transverse to the flat side 14 of the current-collecting lugs 2.

The lug tongues 9, 9' of the current-collecting lugs 2 of the positive electrode plates 15 are plugged through the transverse slots 3, 3' of the positive terminal yoke 1, the positive current-collecting lugs 2 being aligned approximately parallel to the flat side of the associated electrode frameworks and at right angles to the terminal yoke 1 and to the electrode stack 5. The reason why this is advantageous is because, in the region where the current-collecting lug 2 is welded on, the electrode frameworks, especially a fiber structure design, then experience no load or only a slight load due to a shear stress. For this purpose, it is appropriate to apply the current-collecting lugs 2, which are plugged into the transverse slots 3, 3' and project upwards essentially vertically from the electrode stack 5, with their upper end region 4 on the left-hand or on the right-hand side of the webs 10.

By contrast, the lug tongues 9, 9' of juxtaposed current-collecting lugs 2, which are spaced apart from one another only by an interposed recombiner 19, of the negative electrode plates are led together at their free end region 4 on the terminal yoke side and plugged, mostly in pairs, through a transverse slot 3, 3' of tho negative terminal yoke 1 assigned to them. It is common to both the positive and negative electrode connections that the respective weld-on rims 7 of the respective current-collecting lugs 2, which are provided with welding knobs, project over the flat side 6 of the associated terminal yoke 1 which faces away from tho electrode stack 5, and that the current-collecting lugs 2 are welded by electrical resistance welding on the flat side 6, remote from the electrode stack 5, of the respectively assigned terminal yoke 1.

In certain embodiments, the terminal yokes 1 are provided with one of the webs 10 being thicker than the adjacent webs 10 and against which a current-collecting lug 2 bears against the left-hand rim and the next current-collecting lug 2 of the same polarity bears against the right-hand rim. Thus, no weld-on rim 7 projects from the terminal yoke 1 after the current-collecting lugs 2 have been bent over onto the flat side 6 of the webs 10 remote from the electrode stack 5.

Since the lug tongues 9, 9' of a current-collecting lug 2 are spaced apart from one another by a cutout, it is appropriate for the cutout to be designed in such a way that when the lug tongues 9, 9' are plugged into the assigned transverse slots 3, 3', the cutout forms a stop limiting the plug-in depth of the current-collecting lug 2, and that the width of the cutout corresponds approximately to the width of the solid middle part of the terminal yoke 1 plus an extra amount facilitating the plugging-in.

The number of the transverse slots 3, 3' assigned to the individual current-collecting lugs 2 is two smaller than the total number of the positive electrode plates 15, as a result of which the outer positive current-collecting lugs 2 can in each case be applied to the free outside surface of the outer webs 10 which is assigned to them and is easily accessible. It is appropriate, furthermore, to dimension the extent of the terminal yoke 1 in this direction in such a way that the ends 16, 16' of the terminal yoke 1 do not project over the boundaries of the electrode stack 5, as a result of which the electrode stack 5 can be effectively pressed into the storage device housing. A projection which corresponds to twice to fifteen times the thickness of the current-collecting lug 2 has proved to be a satisfactory dimension in this regard. In the present embodiment, the terminal yokes 1 are plugged onto the current-collecting lugs 2 either before or after the insertion of the electrode stack 5 into the storage device housing, and then welded on.

The production of an electrochemical storage device according to the invention is described below and represented in principle in FIGS. 10 and 11. After the electrode frameworks with the current-collecting lugs 2 are welded to electrode plates 15 and completely prepared for assembly, the electrode plates 15 are stacked on one another with the intermediate positioning of various parts, such as separators 18, recombiners 19 etc. transverse to the flat irons of the electrode plate 15 to form an electrode stack 5. The electrode stack 5 is insulated on the outside by means of the stack insulation 20.

The free end regions 4 of the current-collecting lugs 2 are plugged into the transverse slots 3, 3' of the terminal yoke 1 which corresponds to their polarity, in such a way that the weld-on rims 7 of the current-collecting lugs 2 project over the flat side 6 of the webs 10 or of the terminal yoke 1 remote from the electrode stack 5. Subsequently, the weld-on rims 7 are bent in the direction of the flat side 6, onto which welding is to take place, of the terminal yoke 1 onto the webs 10 and firmly welded thereon.

So that no weld-on rim 7 projects after the current-collecting lug 2 has been welded on the flat side 6 of the webs 10 remote from the electrode stack 7, it is expedient for the weld-on rim 7 of at least one current-collecting lug 2 situated at the end in the electrode stack 5 to be bent over in the direction of a web 10 which is already overlapped by another weld-on rim 7.

For the purpose of realizing good results when welding, the weld on rims 7 are provided with solid walled welding knobs, which are provided in the region of the weld-on rim 7 by penetration of the current-collecting lugs 2, the penetrated sheet metal tongues forming the sides of the welding knobs. The sheet metal tongues are at an angle of between 75° and 105°, in particular approximately 90°, to the flat side 14 of the current-collecting lug 2 which is to be welded on. Their inside diameter is between 0.5 mm and 2.0 mm and the mutual spacing of the individual welding knobs from one another is between 1.3 and 5 times their outside diameter.

Figure 10:
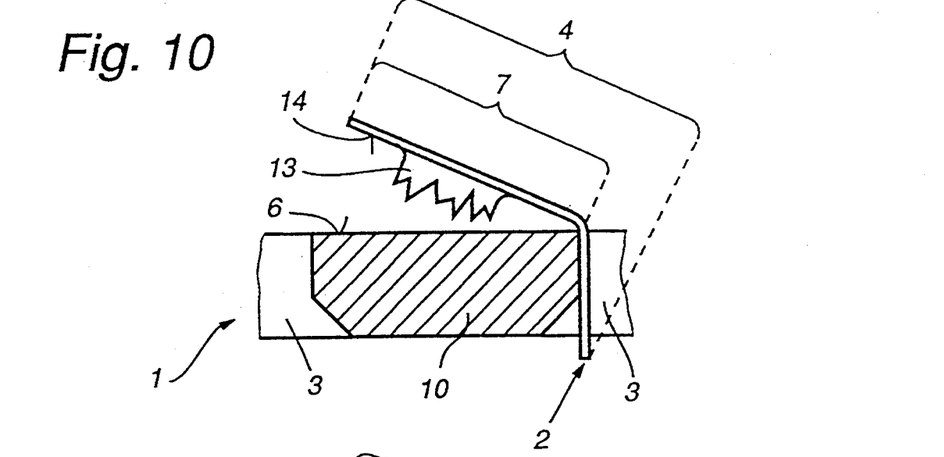
FIG. 10 shows a welding knob of a weld-on rim of a current-collecting lug, which knob is applied to the flat side of the terminal yoke remote from the electrode stack.
Figure 11:
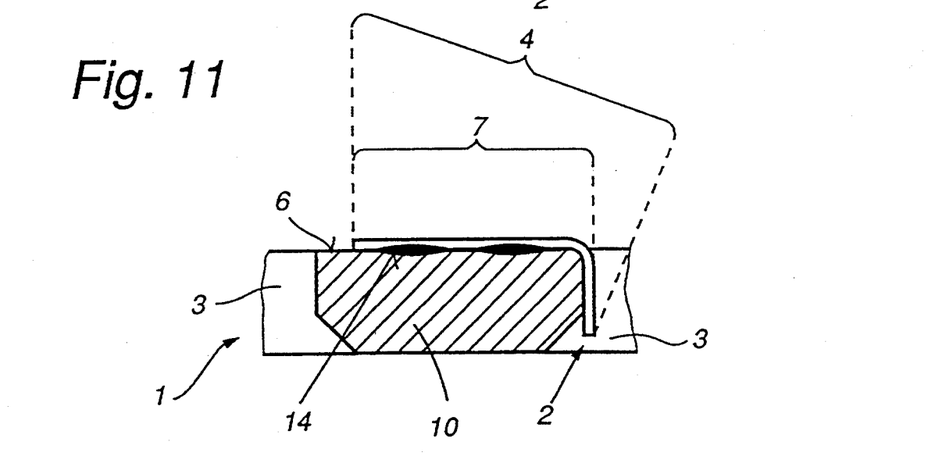
FIG. 11 shows a welded connection between a terminal yoke and a weld-on rim of a current-collecting lug according to FIG. 10.

As may be seen, in particular, from FIG. 10, before the welding current flows the pushed out sheet metal tongues of a material protuberance 13 are generally situated approximately in the middle of the webs 10 on the flat side 6 of the terminal yoke 1 on which welding is no take place. When the welding current is flowing, the material of the sheet metal tongues melts, and the weld-on rim 7 is applied to make Contact with the flat side 6 be welded and is welded thereto (see FIG. 11). Another possibility for providing welding knobs is to punch out cutouts 11 in the weld-on rims 7 and thereby to expose tongues 17 spaced apart from one another.

Figure 12:
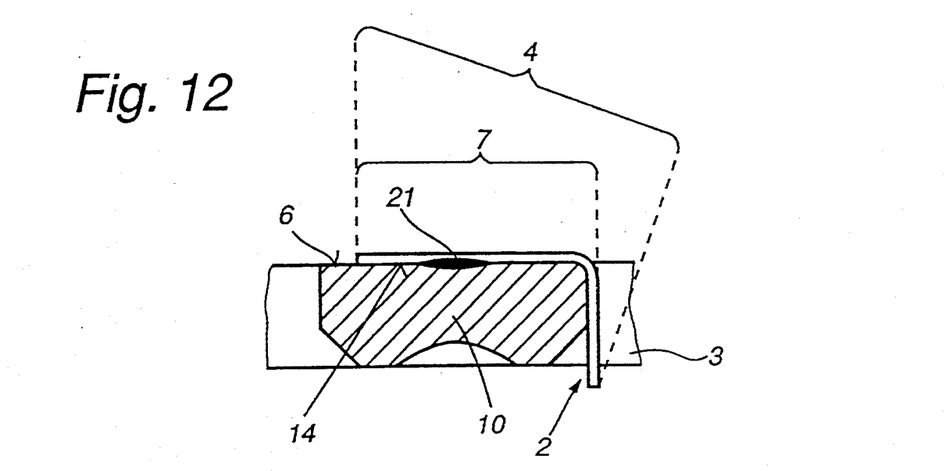
FIG. 12 shows a welded connection between a terminal yoke provided with knobs and a weld-on rim of a current-collecting lug.

A further design of the welded connection between the terminal yoke 1 and the weld-on rim 7 of a current-collecting lug 2 is described in FIG. 12. This exemplary embodiment differs from the preceding ones that in this case the flat side 6 of the terminal yoke 1 remote from the electrode stack 5 is provided with welding knobs 21. The result is once again to simplify the welding.

In the type of welding presented here, it is particular advantage that the current-collecting lugs can be welded to the terminal yoke 1 independently of the progress of the assembly of the electrode stack 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Electrochemical storage device comprising:
   electrode plates of different polarity alternately stacked on one another to form an electrode stack, each electrode plate including an electrode framework and a current-collecting lug arranged thereon, the current-collecting lugs having weld-on rims arranged on a free end region; and
   a terminal yoke extending parallel to the electrode stack and transverse to a flat side of the current-collecting lugs, with individual identically polarized current-collecting lugs being connected in an electrically conductive fashion by their weld-on rims to the terminal yoke, the terminal yoke having a flat side remote from the electrode stack, and a transverse slot at a location of a current-collecting lug into which the free end region of the current-collecting lug at least projects, the current-collecting lug being attached to said terminal yoke on the flat side of the terminal yoke.

2. Electrochemical storage device according to claim 1, wherein the weld-on rim of the current-collecting lug projects at least up to the flat side of the terminal yoke remote from the electrode stack and is welded to the terminal yoke in the region of this flat side of the terminal yoke.

3. Electrochemical storage device according to claim 1, wherein the weld-on rim of the current-collecting lug projects over the flat side of the terminal yoke remote from the electrode stack and, in a region angled off there, is welded to the flat side of the terminal yoke by electrical resistance welding.

4. Electrochemical storage device according to claim 1, wherein the terminal yoke has a solid middle part having a longitudinal center line, and transverse slots arranged on both sides of the longitudinal center line of the solid middle part, the transverse slots aligned with one another in a transverse direction relative to the longitudinal center line.

5. Electrochemical storage device according to claim 1, wherein the terminal yoke has a solid middle part having mutually aligned transverse slots arranged on both sides of a longitudinal center line of the solid middle part, the transverse slots arranged along one side of the terminal yoke extending deeper into the terminal yoke than the transverse slots arranged along the other side of the terminal yoke.

6. Electrochemical storage device according to claim 4, wherein the free end region of the current-collecting lug has lug tongues assigned to the opposite transverse slots.

7. Electrochemical storage device according to claim 1, wherein the external dimension of the terminal yoke corresponds to the extent of the assigned weld-on rims of the current-collecting lugs, measured in the direction and at the level of the transverse slots.

8. Electrochemical storage device according to claim 1, wherein at least one of the weld-on rims of the current-collecting lug projects over the flat side remote from the electrode stack and is provided with welding knobs, and in that measured parallel to the surface normal of the current-collecting lug the clear width of the transverse slots corresponds at least to the thickness of the current-collecting lug plus the height of the welding knobs above the current-collecting lug.

9. Electrochemical storage device according to claim 8, wherein the welding knobs are constructed with solid walls and are spaced apart from one another by material recesses, the material recesses being deeper than a degree of sinking during a welding of the weld-on rim onto the terminal yoke.

10. Electrochemical storage device according to claim 8, wherein the welding knobs are material protuberances having sides that project transversely from the flat side of the weld-on rim.

11. Electrochemical storage device according to claim 1, wherein the current-collecting lug has a thickness of between 0.1 mm and 1.0 mm.

12. Electrochemical storage device according to claim 1, wherein a width of the transverse slots is 7 to 18 times the thickness of the current-collecting lugs.

13. Electrochemical storage device according to claim 1, wherein a flat side of a web, remote from the electrode stack, situated between two adjacent transverse slots has welding knobs.

14. Electrochemical storage device according to claim 1, wherein the width of a web situated between two adjacent transverse slots corresponds to 10 to 25 times the thickness of the current-collecting lugs.

15. Electrochemical storage device according to claim 1, wherein the transverse slots of the terminal yoke are aligned with the current-collecting lugs inside the electrode stack.

16. Electrochemical storage device according to claim 15, wherein the current-collecting lugs, which are plugged into the transverse slots, project upwards essentially vertically from the electrode stack, are applied at an upper end region on one of the left-hand and the right-hand side of the webs.

17. Electrochemical storage device according to claim 15, wherein the terminal yoke has a web which is thicker than adjacent webs and against which one of the current-collecting lugs bears on the left-hand rim thereof, and against which a second one of the current-collecting lugs of the same polarity bears at the right-hand rim thereof.

18. Electrochemical storage device according to claim 1, wherein the transverse slots are chamfered on the flat side of the terminal yoke facing the electrode stack.

19. Electrochemical storage device according to claim 1, wherein the transverse slots are chamfered on the flat side of the terminal yoke remote from the electrode stack.

20. Electrochemical storage device according to claim 1, wherein the number of the transverse slots assigned to the individual current-collecting lugs is two smaller than the total number of the positive electrode plates.

21. Electrochemical storage device according to claim 1, wherein the ends of the terminal yoke project out over the two current-collecting lugs situated at the end in the electrode stack.

22. Electrochemical storage device according to claim 21, wherein the projecting ends of the terminal yoke have an extent which corresponds to twice to fifteen times the thickness of the current-collecting lugs (2).

23. Electrochemical storage device according to claim 1, wherein the transverse slots are open at the rim.

24. Electrochemical storage device according to claim 15, wherein the thickness of the terminal yoke is between 1.5 mm and 6 mm.

25. Electrochemical storage device according to claim 8, wherein the welding knobs are constructed with solid walls and are spaced apart from one another by the cutouts.

26. Method for producing an electrochemical storage device comprising:
   forming a plurality of electrode plates by welding, for each of said plurality of electrode plates being formed, a current-collecting lug having a weld-on rim on an end of an electrode framework;
   stacking the electrode plates on one another with the intermediate positioning of elements transverse to flat sides of the electrode plates to form an electrode stack;
   insulating outer regions of the electrode stack;
   inserting the electrode stack into a housing;
   plugging the weld-on rims of the current-collecting lugs into transverse slots of a terminal yoke;
   connecting in an electrically conductive manner, the individual, identically polarized current-collecting lugs to the terminal yoke assigned to said polarity, the current-collecting lugs being connected to said terminal yoke by the weld-on rims of free ends of the current-collecting lugs, the terminal yoke having webs between the transverse slots, and a terminal pillar;
   wherein the step of connecting the current-collecting lugs to the terminal yoke includes electrical resistance welding of the weld-on rims of the current-collecting lugs to the webs of the terminal yoke.

27. Method according to claim 26, wherein the free end regions of the current-collecting lugs are plugged into the transverse slots of the terminal yoke such that the weld-on rims project at the flat side of the terminal yoke onto the webs and firmly welding the weld-on rims on the webs.

28. Method according to claim 27, wherein the weld-on rim of at least one current-collecting lug situated at the end in the electrode stack is bent over in the direction of a web already overlapped by another weld-on rim.

29. Method according to claim 26, wherein the electrode stack is completely assembled prior to the welding of the current-collecting lugs to the terminal yoke.

30. Method according to claim 26, further comprising providing the weld-on rims with welding knobs.

31. Method according to claim 30, wherein the step of providing the welding knobs includes penetrating the current-collecting lugs in the region of the weld-on rim.

32. Method according to claim 30, further comprising punching out cutouts in the weld-on rims and exposing, via punching, tongues spaced apart from one another.

* * * * *